(12) United States Patent
Cheng et al.

(10) Patent No.: US 6,585,334 B2
(45) Date of Patent: Jul. 1, 2003

(54) RECEIVING DEVICE

(75) Inventors: Sheng-Hsiung Cheng, Taipei Hsien (TW); Ming-Chin Huang, Taipei Hsien (TW)

(73) Assignee: Aopen Inc., Taipei Hsien (TW)

( * ) Notice: Subject to any disclaimer, the term of this patent is extended or adjusted under 35 U.S.C. 154(b) by 44 days.

(21) Appl. No.: 09/931,768

(22) Filed: Aug. 20, 2001

(65) Prior Publication Data

US 2002/0043913 A1 Apr. 18, 2002

(30) Foreign Application Priority Data

Aug. 28, 2000 (TW) .................................. 89214948 U

(51) Int. Cl.⁷ .............................................. A47B 95/02
(52) U.S. Cl. ..................... 312/332.1; 312/323; 312/333
(58) Field of Search ................................. 312/323, 322, 312/333, 332.1, 223.1, 223.2, 9.52, 9.63; 292/80, 86, 89, 87, 19, 20; 361/683, 684, 685, 724–727, 747

(56) References Cited

U.S. PATENT DOCUMENTS

| | | | | | |
|---|---|---|---|---|---|
| 3,219,404 A | * | 11/1965 | Machingo et al. | ........... | 312/333 |
| 3,953,094 A | * | 4/1976 | Brown, Jr. | ............... | 312/332.1 |
| 4,145,096 A | * | 3/1979 | Sitsen et al. | ................. | 312/322 |
| 4,399,913 A | * | 8/1983 | Gelardi et al. | ............... | 312/322 |
| 4,842,348 A | * | 6/1989 | Ackeret | ....................... | 312/323 |
| 4,896,925 A | * | 1/1990 | Nehl | ........................... | 312/323 |
| 5,080,452 A | * | 1/1992 | Tuckman | ..................... | 361/683 |
| 5,215,364 A | * | 6/1993 | Moore | ......................... | 312/323 |
| 6,082,845 A | * | 7/2000 | Eizadkhah et al. | ......... | 312/323 |
| 6,231,145 B1 | * | 5/2001 | Liu | .......................... | 312/332.1 |
| 6,330,147 B1 | * | 12/2001 | Adams et al. | .............. | 361/685 |
| 2001/0036060 A1 | * | 11/2001 | Saito et al. | .................. | 361/685 |

FOREIGN PATENT DOCUMENTS

| | | | | | |
|---|---|---|---|---|---|
| DE | 4234699 | * | 4/1993 | | |
| EP | 0082219 | * | 6/1983 | ................ | 312/323 |
| JP | 4148314 | * | 5/1992 | ................ | 361/685 |

* cited by examiner

Primary Examiner—Lanna Mai
Assistant Examiner—Hanh V. Tran
(74) Attorney, Agent, or Firm—Bacon & Thomas, PLLC

(57) ABSTRACT

A receiving device is introduced for collecting goods such as CDs. The receiving device includes a cabinet and a storage element. The cabinet further comprises a fixing hole and the storage element further comprises a respective fixing rod with an inverted-V top for mating with the fixing hole. The storage element is located inside the cabinet while the fixing rod engages with the fixing hole. The storage element further provides a panel. While the panel rotates to disengage the fixing rod from the fixing hole, the storage element can be separated from the cabinet.

10 Claims, 3 Drawing Sheets

RECEIVING DEVICE

BACKGROUND OF THE INVENTION

1. Field of the Invention

The invention relates to a receiving device, and more particularly to an elastic press-type receiving apparatus for a personal computer.

2. Description of the Prior Art

In daily life, a receiving device such as a drawer is one of the ordinary apparatus for collecting goods. The following is a brief description of operations of pulling and locking for the conventional receiving devices in the market. A conventional receiving device usually has a handle or a groove for processing the pulling operation. While the receiving device is positioned, locking or not is a choice of the user and also depends on the specific type of the device in usage. In the case that the receiving device needs to be locked, a linkage such as a lock, a protrusion, a latch or the like is usually constructed. Since the receiving device is equipped with such a complicated locking linkage including at least a lock and a protrusion, the receiving device then can be locked as long as it is positioned. Obviously, the construction of conventional locking linkages can lead to higher cost and substantial construction room.

Focusing on the receiving devices used in the computer industry, it is usually seen that a personal computer can provide several 5¼" empty slots for installing therein a 5¼" floppy disk driver, a CD-ROM device, and so on. In the art, through a 5¼" floppy disk can provide a storage capacity of 1.2 MB, yet, for most of the users, such a memory space is not sufficient. On the other hand, currently in the market, a personal computer in the product line is usually sold with only one slot occupied by a CD driver and the rest of the slots in the computer are left empty.

To efficiently utilize these empty 5¼" slots, a receiving device in the art has been introduced. In this application of the receiving device, several disk collecting boxes are integrated into a square case, and each of the disk collecting boxes can be individually pulled from or pushed into the square case. A single disk collecting box is designed to store a single disk only, and the square case is targeted to occupy an empty 5¼" slot. That is, the height of the square case cannot exceed the vertical dimension of the 5¼" slot.

Hence, an obvious disadvantage of aforesaid receiving device is that only a limited amount of disks can be received. In general, a square case can only accommodate five disks.

SUMMARY OF THE INVENTION

Accordingly, it is a primary object of the present invention to provide an elastic press-type receiving device which is produced by plastic forming in a single piece and by spring-ejecting.

It is another object of the present invention to provide a CD receiving device which can be installed to the 5¼" disk slot of the computer. The receiving device in accordance with the present invention needs no more handles. The user needs only to press a panel of a storage element of the receiving device for relieving fastening components, and then an internal spring can eject the storage element accordingly from a cabinet to make easy the further pulling out of the storage element.

To achieve the above objects, the receiving device in accordance with the present invention comprises the storage element and the cabinet. The storage element further comprises the panel, a central axis and a protrusion. The panel is rotatably connected with the central axis. The protrusion is pivotally connected to a lateral side of the storage element. Also, the protrusion is shaped as an inverted V and provides an inverted-V top at a vertex of the V, which provides another end to contact with the panel. The cabinet further includes a fixing hole for engaging with the fixing rod. In the case that the inverted-V top of the fixing rod engages the fixing hole, the storage element can be fixed in the cabinet. On the other hand, in the case that the inverted-V top is disengaged with the fixing hole by rotating the panel about the central axis, then the storage element can be separated from the cabinet.

All these objects are achieved by the elastic receiving device described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a receiving device. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
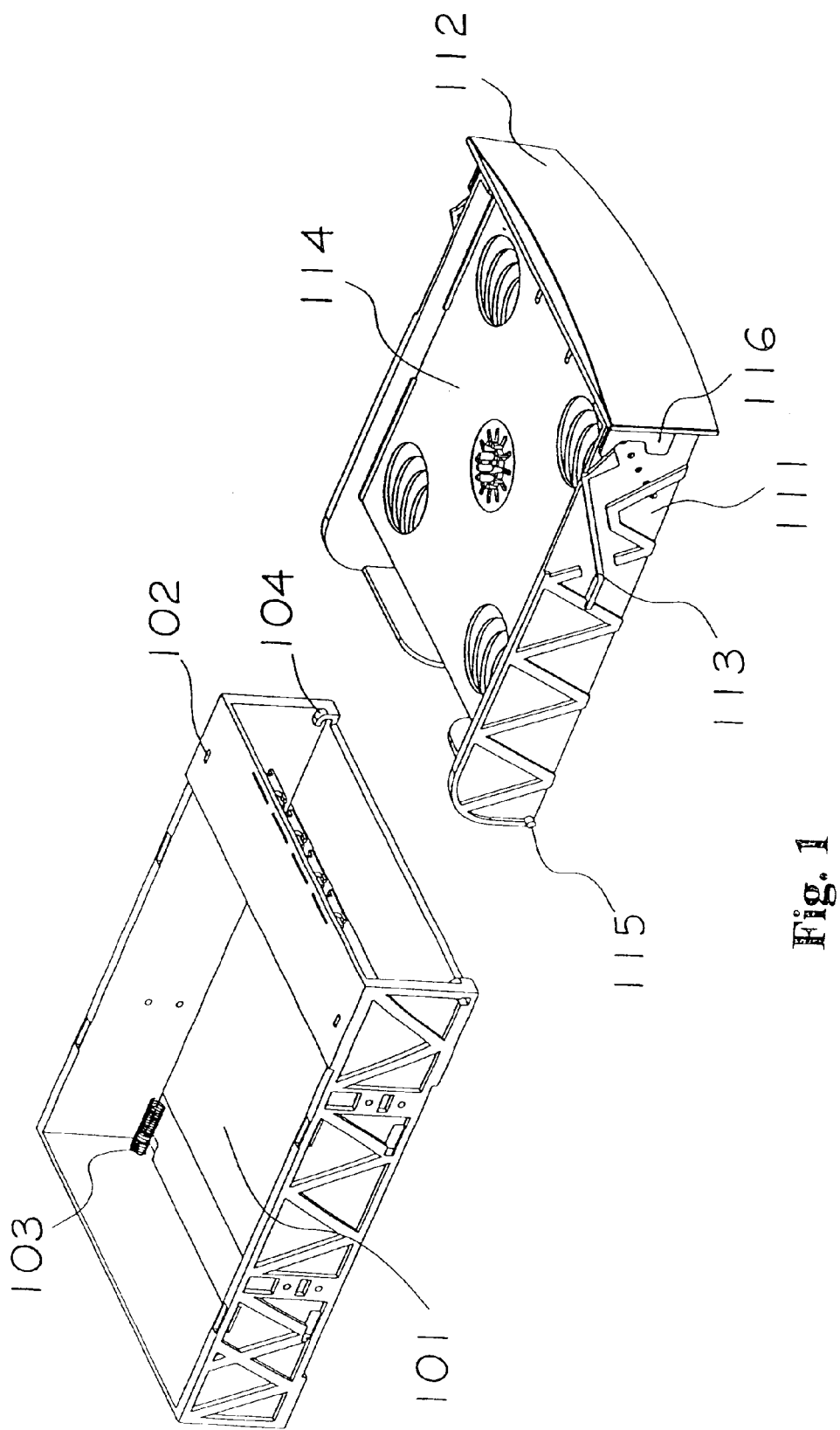
FIG. 1 is a perspective view of a preferred embodiment of the receiving device in accordance with the present invention, showing that the storage element and the cabinet are disassembled.

Referring now to FIG. 1, a preferred embodiment of the present invention is shown perspective, in which the receiving device comprises a storage element 111 and a cabinet 101. As shown, the cabinet 101 comprises a fixing hole 102, a spring 103, and a groove 104. The storage element 111 comprises a rotating panel 112, a fixing rod 113, CD receiving layers 114, a protrusion 115 and a central axis 116. Each of the CD receiving layers 114 provides two opposing sides for individually collecting a CD. In this embodiment, the storage element 111 includes five CD receiving layers 111; i.e. the storage element 111 of the present invention can collect ten CDs.

Figure 2:
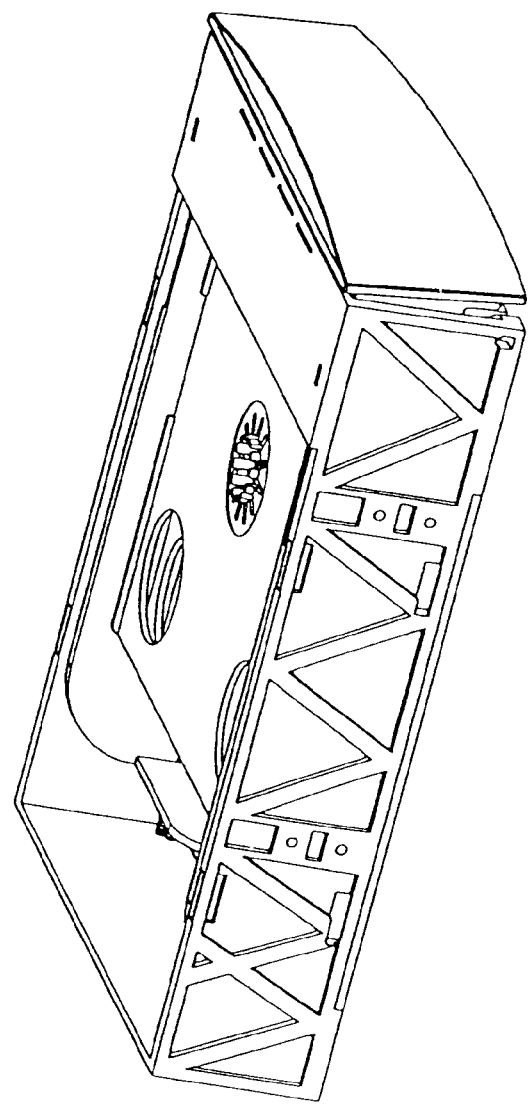
FIG. 2 is a perspective view of the preferred embodiment of FIG. 1, showing that the storage element is accommodated inside the cabinet.

In the following description, the present invention show how to fix the storage element 111 into the cabinet 101. When the storage 111 slips into the cabinet 101, the fixing rod 113 is forced to move downward. When the storage element 111 reaches a predetermined position inside the cabinet 101, the top end of the fixing rod 113, i.e. the inverted-V top, can be held by the fixing hole 102 of the cabinet 101. At the same time, the spring 103 is depressed by the storage element 111 to generate a deformation of compression. The compression deformation of the spring 103 can generate an outward force upon the storage element 111. Such an outward force provided by the spring 103 can fasten the top end of the fixing rod 113 firmly into the fixing hole 102 of the cabinet 101, so that the storage element 111 can not be easily retrieved from the cabinet 101. Upon such an arrangement, the storage element 111 can be thus secured inside the cabinet 101 as shown in FIG. 2.

On the other hand, following description will be elucidated how the storage element 111 is ejected from the cabinet 101. When the storage element 111 is intended to be ejected from the cabinet 101, the user needs to press an upper end of the rotating panel 112 for rotating the panel 112 about the central axis 116. By providing the rotation, the fixing rod 113 can be separated from the fixing hole 102. Then, while the user relieves the rotating panel 112, spring force generated by the spring 103 can eject the storage element 111 by a substantial distance. Thereby, the user can retrieve successfully the storage element 111 from the cabinet 101.

Figure 3:
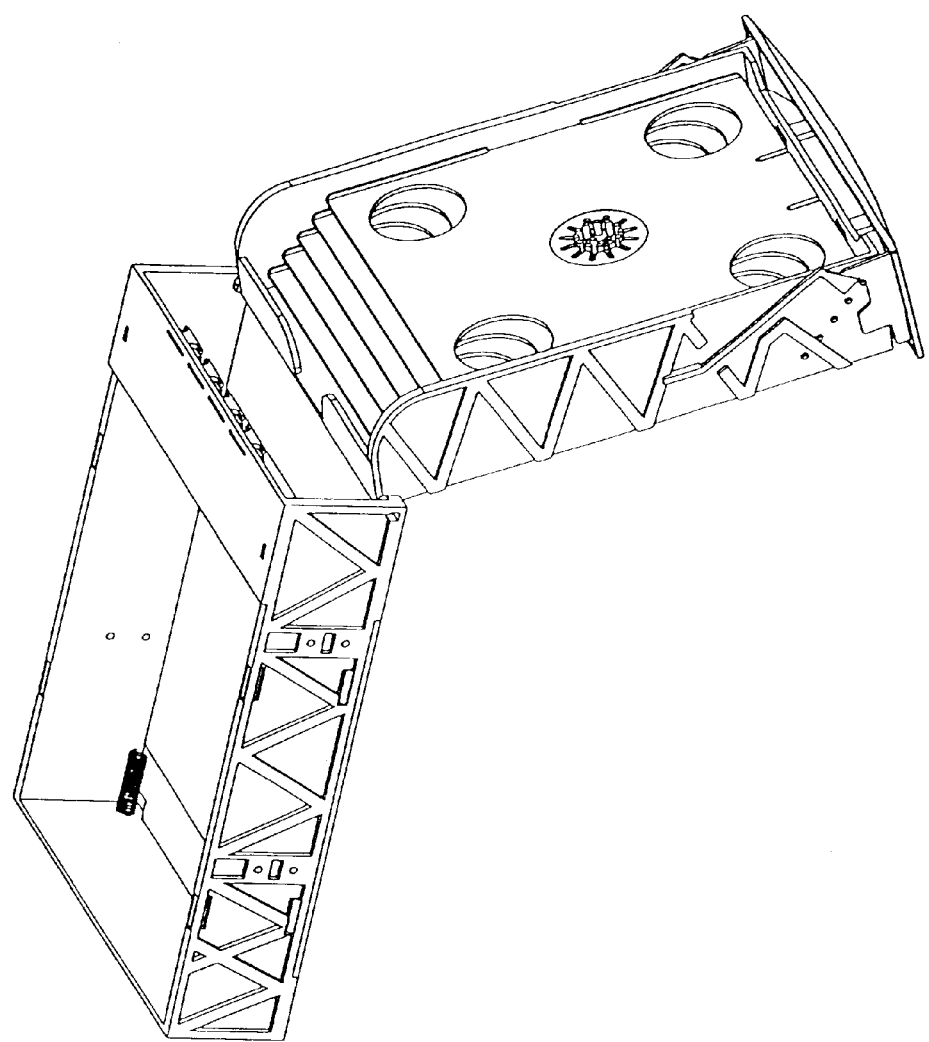
FIG. 3 is a perspective view of a preferred embodiment of FIG. 1, showing the storage element is fully pulled out from the cabinet.

In the present invention, by providing the combination of the groove 104 and the protrusion 115, the user can easily access a lower layer of the CD receiving layers 114 for removing or storing a CD therein. When the user pulls the storage element 111 to a predetermined maximum distance, the protrusion 115 can engage with the groove 104. As long as the protrusion 115 enters the groove 104, the storage element 111 can then rotate by a predetermined angle about the protrusion 115. After the storage element 111 rotates the predetermined angle, rotation of the storage element 111 is stopped and a hanging over status or a fully pullout status of the storage element 111 as shown in FIG. 3 is achieved. When the storage element 111 is hung as shown, the user can arbitrarily access to any CD receiving layer 114 for searching a desired CD or for storing a CD. When the user finishes the searching or the storing of a CD, the storage element 111 can then be pushed into the cabinet 101 again.

In the present invention, as long as the user lifts the storage element 111 a predetermined distance right at a moment that the storage element 111 is pulled before the maximum distance is reached, the storage element 111 can then be separated fully from the cabinet 101 for removing or storing the CD more easily.

The fastener mechanism of the present invention is provided by the fixing hole 102 and the respective fixing rod 113. Also, the resilience to eject the storage element 111 is provided by the spring 103.

In previous description, the preferred embodiment is constructed on a computer. However, the present invention can also be applied to any conventional furniture having a storage element 111, such as a desk, a case and so on.

In the present invention, the spring can be also located at the rear of the storage element 111, other than the rear of the cabinet 101. Under this arrangement, resilience can still be provided by the spring to eject the storage element 111 from the cabinet 101.

In the present invention, low-cost plastic structure can be applied to achieve the elasticity and the fastening structure for reducing the cost.

While the present invention has been particularly shown and described with reference to a preferred embodiment, it will be understood by those skilled in the art that various changes in form and detail may be without departing from the spirit and scope of the present invention.

What is claimed is:

1. A receiving device, comprising:
   a storage element having a panel, a central axis and a fixing rod, the panel being rotatably connected with the central axis for contacting an end of the fixing rod, the fixing rod being pivotally connected to a lateral side of the storage element and shaped as an inverted V having a top at a vertex of the V; and
   a cabinet, having a fixing hole for engaging the fixing rod so as to lock the storage element;
   wherein the storage element is fixed in the cabinet when the inverted-V top of the fixing rod engages the fixing hole upon pushing said storage element into the cabinet to a first position; and the storage element is separated from the cabinet when the inverted-V top is pushed by the panel to a second position so that said top of the fixing rod disengages the fixing hole by rotating the panel about the central axis.

2. The receiving device according to claim 1, wherein said cabinet further comprises a groove located at a side thereof.

3. The receiving device according to claim 2, wherein said storage element further comprises a protrusion located at said lateral side for pairing with said groove of said cabinet to make said storage element pivotable with respect to said cabinet so that it hangs from the cabinet when the drawer is pulled out of the cabinet.

4. The receiving device according to claim 1, wherein said storage element further comprises a receiving layer pivotal with respect to said storage element.

5. The receiving device according to claim 1, wherein said cabinet further comprises a spring that deforms when said storage element is located inside said cabinet and that provides an outward spring force to cause said storage element to be separated from said cabinet when said inverted-V top of said fixing rod disengages said fixing hole.

6. The receiving device according to claim 1, wherein said storage element further comprises a spring that deforms when said storage element is located inside said cabinet and that provides an outward spring force to cause said storage element to be separated from said cabinet when said inverted-V top of said fixing rod disengages said fixing hole.

7. A CD receiving device for being installed to a disk slot of a computer, comprising:
   a storage element having a panel, a central axis, a fixing rod and a CD receiving layer for collecting CD, the panel being rotatably connected with the central axis for contacting the fixing rod, the fixing rod being pivotally connected to a lateral side of the storage element, the fixing rod being shaped as an inverted V having a top at a vertex of the V; and
   a cabinet, having a spring and a fixing hole for engaging the fixing rod so as to lock the storage element;
   wherein the storage element is fixed in the cabinet and the spring is deformed when the inverted-V top of the fixing rod being pushed by the panel to a first position so that said top of the fixing rod engages the fixing hole; and an outward force of the spring causes the storage element to separate from the cabinet when the panel is rotated about the central axis and the inverted-V top is pushed by the panel to a second position in which the top of the fixing rod disengages the fixing hole.

8. The receiving device according to claim 7, wherein said cabinet further comprises a groove located at a side thereof.

9. The receiving device according to claim 8, wherein said storage element further comprises a protrusion located at said lateral side for pairing with said groove of said cabinet to make said storage element hanging able with respect to said cabinet.

10. A CD receiving device for being installed to a disk slot of a desktop computer, comprising:
    a storage element having a central axis, a fixing rod, a protrusion and a CD receiving layer for collecting CD, the panel being rotatably connected with the central axis for contacting the fixing rod, the fixing rod pivotally connected to a lateral side of the storage element, the fixing rod being shaped as an inverted V and providing an end thereof to contact with the panel, the protrusion located at the lateral side thereof; and a cabinet, having a spring, a groove and a fixing hole for engaging the fixing rod, the groove located at a side of the cabinet; and the groove and the protrusion mutually engaging to make the storage element pivotable with respect to the cabinet so that it hangs from the cabinet when the drawer is pulled out of the cabinet;

wherein the storage element is fixed in the cabinet and the spring is deformed when the inverted-V top of the fixing rod being pushed by the panel to a first position so that said top of the fixing rod engages the fixing hole; and an outward force of the spring causes the storage element to separate from the cabinet when the panel is rotated about the central axis and the inverted-V top is pushed by the panel to a second position in which the top of the fixing rod disengages the fixing hole.

* * * * *